3,000,802
CONTROL OF NUCLEAR REACTIONS
David K. Worn, Solihull, England, and Ralph E. Buttress, Glasgow, Scotland, assignors to The International Nickel Company, Inc., New York, N.Y., a corporation of Delaware
No Drawing. Filed Dec. 16, 1958, Ser. No. 780,686
Claims priority, application Great Britain Jan. 3, 1958
13 Claims. (Cl. 204—154.2)

The present invention relates to a solid body made by powder metallurgical methods and capable of absorbing neutrons in which an element having a high neutron-absorbing capacity is present in elemental or combined form as a discrete phase dispersed in a matrix.

The chain reactions which take place in nuclear reactors are accompanied by the liberation of neutrons. The rate at which the fission chain reaction proceeds must be controlled and this is usually done by inserting into the reactors an element which has a high capacity for the absorption of neutrons. The element, which may be used in elemental or combined form, is usually incorporated in a carrier, which itself may be a rod. The carrier must be corrosion resistant and in some reactors must be able to withstand high temperatures.

The most efficient elements for absorbing neutrons in a thermal reactor are boron, cadmium and certain of the rare earth metals such as gadolinium and europium, but it is not easy to put them into convenient forms for the purpose. Boron cannot be incorporated in conventional melted alloys in concentrations above about 4% without severe embrittling effects. Borax may be packed in steel linings to form a neutron-absorbing device, but such a device is very bulky. Metallic cadmium and alloys containing useful amounts of cadmium have very low melting points and can only be used in reactors operating at low temperatures. It is also difficult to incorporate the rare earth metals and their compounds in more than small amounts in alloys by conventional melting methods.

It is an object of the present invention to provide a neutron-absorbing device in tubular form which may be provided with inner and outer corrosion-resisting surfaces.

It is a further object of the present invention to provide a method for producing by powder metallurgical methods a tubular neutron-absorbing device.

The invention also contemplates providing a nuclear reactor having at least one neutron-absorbing device wherein said neutron-absorbing device is in tubular form.

According to the present invention the shaped body in such a neutron-absorbing device is tubular and the covering comprises inner and outer tubes of stainless steel or other corrosion resistant alloy.

The invention includes the method of making such shaped bodies. It is difficult, and frequently not practicable, to form a flat strip of the heterogeneous neutron-absorbing material into a tube, especially a tube of small diameter, since such materials generally have poor ductility and, further, they would be difficult to weld along the seam. We, therefore, prefer to form the tubular shaped body by packing a mixture of the material used for the matrix and that used for the neutron-absorbing phase in powder form between inner and outer tubes of the covering material and reducing the diameter of the assembly, its wall thickness, or both, for example, by drawing the assembly through a die or swaging it to provide close dimensional control in the finished product. Intermediate annealing treatments are carried out at a high temperature between successive reductions so that the constituents of the neutron-absorbing body are simultaneously sintered and bonded together and to the covering tubes.

The matrix of the neutron-absorbing body may be formed of copper and the dispersed phase of boron carbide.

By way of example, two coaxial tubes of stainless steel, one 3 inches and the other 2 inches in outside diameter and both of $\frac{1}{16}$-inch wall thickness, were swaged together at one end to form a rigid unit 5 feet long. The annular gap between the tubes was packed with a mixture of copper and boron carbide powders and the open end plugged with self-locking copper washers of U-section. The complete unit was drawn down through a die, using a mandrel, to an outside diameter of 2.2 inches and an inside diameter of 1.6 inches. This reduction required five passes and between successive passes the unit was annealed at 950° C. to 1000° C. in an atmosphere of hydrogen or cracked ammonia. Only a small reduction in the wall thickness of the composite tube was made in any single pass, the maximum reduction in one pass being about 15%.

To ensure that the neutron-absorbing body bonds to the covering tubes, it may be necessary first to coat the tubes on the appropriate surfaces with a layer of another metal. Thus, when the neutron-absorbing body comprises copper and boron carbide and the covering tubes are of stainless steel, the steel surfaces may first be electroplated with a thin coating of nickel, for example, 0.002 inch in thickness, and on top of this with a layer of copper, for example, 0.005 inch in thickness. The purpose of the pure copper interlayer in this instance is to inhibit contamination and consequent embrittlement of the stainless steel cladding immediately adjacent to the core material by the boron carbide phase.

An alternative way of making the composite unit according to the invention is to pack the constituents of the neutron-absorbing body between coaxial tubes of a metal to which the matrix metal will readily weld under the influence of pressure and heat, reduce this assembly as before by drawing or swaging, with intermediate annealing treatments, and then apply the covering tubes by drawing. Thus, a mixture of copper and boron carbide may first be packed between copper tubes, the assembly drawn down, and outer and inner covering tubes of stainless steel or other corrosion resistant alloy, previously coated with nickel on their inner and outer surfaces respectively, then drawn on to the assembly. In this way, the difficulty of coating the interior of a tube with metal by electrodeposition may be avoided since nickel may be readily deposited chemically, e.g., by the electroless plating method.

A combination of these two methods may of course be used. For example, the inner tube may be of stainless steel coated successively with nickel and copper on its outer surface, while the outer tube is of copper, a stainless steel outer tube coated on the inside with nickel being subsequently drawn on to the assembly.

In order to obtain the maximum concentration of neutron-absorbing element in the solid body compatible with overall ductility, the neutron-absorbing phase should be of high density and the concentration of the neutron-absorbing element in it should be as high as possible. For the same reason, the neutron-absorbing phase should consist of fairly coarse particles uniformly dispersed within the matrix. A particle size such that the particles will pass through a 60-mesh B.S.S. screen but be retained by a 200-mesh B.S.S. screen is generally suitable.

The materials used for the matrix and the neutron-absorbing phase must be substantially stable at the temperatures employed during manufacture and service and at those temperatures no reaction which would impair the properties of the matrix must occur. Examples of suitable mixtures that can be used are boron carbide and copper, cadmium fluoride and nickel, gadolinium oxide and nickel or iron, and europium oxide and nickel or iron.

Neither boron nor boron carbide is compatible with nickel or iron. Boron as such or as the carbide readily reacts with nickel or iron leading to embrittlement during sintering to such an extent as to preclude any processing by cold rolling. Boron in the amorphous elemental form can be used with copper without this drawback, but in this form it is often so fine and has such high covering power that it hinders bonding between copper particles, so that the combination of elemental boron and copper is then undesirable for this reason.

Gadolinium oxide is also generally produced in a very fine and highly dispersed form so when it is used the particles of it should be agglomerated to larger particles, say of average size 100 to 120 B.S.S. mesh sieve so as to permit satisfactory bonding between the component matrix particles.

Cadmium oxide is not suitable as the neutron-absorbing phase because it has a high vapour pressure at elevated temperatures and is more liable to be lost by volatilization during sintering than is cadmium fluoride.

It will be seen from the foregoing that the mixture of metal powder and neutron-absorbing material which is incorporated in the tubular neutron-absorbing device contemplated in accordance with the present invention as the core thereof may comprise about 10% to about 60% by volume of neutron-absorbing material with the balance a matrix metal such as copper, nickel or iron. The neutron-absorbing material itself may be boron, boron carbide, cadmium fluoride, gadolinium oxide and europium oxide.

The mixtures of matrix metal and neutron-absorbing material which form the core portions of the tubular neutron-absorbing device provided in accordance with the present invention are compacted by powder metallurgical methods which include the step of sintering. The powder mixtures employed in accordance with the present invention may be compacted and sintered within the temperature range of about 800° C. to about 1200° C.

It will be understood that the stainless steel used as the corrosion-resisting surface on the tubular neutron-absorbing device may contain up to about 20% nickel, about 12% to about 30% chromium and the balance essentially iron, including small amounts up to about 4% molybdenum, up to about 3% each of elements such as copper, manganese, silicon, up to about 1.5% columbium and up to about 1% titanium. In general, the corrosion-resisting metal may contain up to about 80% nickel, up to about 90% iron, up to about 35% chromium, up to about 4% molybdenum and up to about 3% of other metals such as copper, manganese and silicon, up to 1.5% columbium and up to about 1% titanium.

The method contemplated in accordance with the present invention provides a tubular neutron-absorbing device which may have a diameter as small as about 1 inch and as large as about 4 inches. The tubular device may have a wall thickness in the range of about 0.2 inch to about 0.75 inch and may be made in any convenient length, for example, about 5 feet up to about 30 feet. The method contemplated in accordance with the present invention also provides a means for producing the tubular neutron-absorbing device with a dimensional consistency on the order of about plus or minus 5%.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. The method for producing a composite neutron-absorbing device in tubular form which comprises assembling in substantially concentric relation tubes made of corrosion resistant metal such that an annular space is provided therebetween, packing said annular space with a mixture of powdered neutron-absorbing material having a particle size between about 60 and about 200 mesh and a metal powder from the group consisting of nickel, copper and iron, subjecting the resulting assembly to at least one cold working operation and at least one annealing operation subsequent to said cold working operation to compact and bond together said powder mixture, whereby a tubular neutron-absorbing device is obtained having a neutron-absorbing phase substantially uniformly dispersed through a metal matrix which is cladded on both the interior and exterior faces with corrosion resistant metal and which is produced to close dimensional tolerance.

2. The method according to claim 1 wherein the mixture of powdered material comprises about 10% to about 60% by volume of boron carbide powder with the remainder essentially copper powder.

3. The method according to claim 1 wherein the mixture of powdered material comprises about 10% to about 60% by volume of cadmium fluoride powder, with the remainder essentially a metal powder from the group consisting of nickel, copper and iron.

4. The method according to claim 1 wherein the mixture of powdered material comprises about 10% to about 60% by volume of gadolinium oxide powder, with the remainder essentially a metal powder from the group consisting of nickel, copper and iron.

5. The method according to claim 1 wherein the mixture of powdered material comprises about 10% to about 60% by volume of europium oxide powder, with the remainder essentially a metal powder from the group consisting of nickel, copper and iron.

6. The method according to claim 1 wherein the mixture of powdered material comprises about 10% to about 60% by volume of a compound from the group consisting of cadmium fluoride, gadolinium oxide and europium oxide, with the remainder essentially a metal powder from the group consisting of nickel, copper and iron.

7. The method for producing a composite neutron-absorbing device in tubular form which comprises preparing a mixture of powdered materials comprising a neutron-absorbing material having a particle size between about 60 and about 200 mesh and a metal from the group consisting of nickel, copper and iron, packing said mixture between coaxial tubes of metal from the group consisting of nickel, copper and iron, subjecting the resulting assembly to at least one cold working operation and at least one annealing operation subsequent to said cold working operation to bond the constituents of the powder mixture together and to said metal tubes, and drawing on to said bonded assembly inner and outer tubes of corrosion resistant alloy to provide said bonded assembly with inner and outer coverings, whereby a composite neutron-absorbing device is produced having closely controlled dimensional tolerance.

8. The method according to claim 7 wherein the mixture of powdered materials comprises about 10% to about 60% by volume of boron carbide powder with the remainder essentially copper powder.

9. The method according to claim 7 wherein the faces of said corrosion resistant alloy tubes which contact said bonded assembly are nickel-plated prior to being drawn on to said assembly.

10. The method according to claim 7 wherein the mixture of powdered material comprises about 10% to about 60% by volume of cadmium fluoride powder, with the remainder essentially a metal powder from the group consisting of nickel, copper and iron.

11. The method according to claim 7 wherein the mixture of powdered material comprises about 10% to about 60% by volume of gadolinium oxide powder, with the remainder essentially a metal powder from the group consisting of nickel, copper and iron.

12. The method according to claim 7 wherein the mixture of powdered material comprises about 10% to about 60% by volume of europium oxide powder, with the remainder essentially a metal powder from the group consisting of nickel, copper and iron.

13. The method according to claim 7 wherein the mixture of powdered material comprises about 10% to about 60% by volume of a compound from the group consisting of cadmium fluoride, gadolinium oxide and europium oxide, with the remainder essentially a metal powder from the group consisting of nickel, copper and iron.

References Cited in the file of this patent

UNITED STATES PATENTS

| | | |
|---|---|---|
| 2,727,996 | Rockwell et al. | Dec. 20, 1955 |
| 2,781,308 | Creutz et al. | Feb. 12, 1957 |
| 2,843,543 | Christy | July 15, 1958 |
| 2,859,163 | Ploetz et al. | Nov. 4, 1958 |
| 2,863,817 | Morris | Dec. 9, 1958 |
| 2,866,741 | Hausner | Dec. 30, 1958 |

OTHER REFERENCES

KAPL–1770, June 6, 1957.